US010450085B2

(12) United States Patent
Williams et al.

(10) Patent No.: US 10,450,085 B2
(45) Date of Patent: *Oct. 22, 2019

(54) WEARABLE ELECTRONIC DISPLAY AND METHOD FOR DISPLAYING INFORMATION TO A PILOT

(71) Applicant: THE BOEING COMPANY, Chicago, IL (US)

(72) Inventors: Jeffrey L. Williams, Parker, CO (US); Jason W. Clark, Englewood, CO (US); Susan A. Foster, Centennial, CO (US); Samantha A. Schwartz, Castle Pines, CO (US); Aaron D. Pilcher, Denver, CO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,978

(22) Filed: Dec. 20, 2016

(65) Prior Publication Data
US 2017/0101193 A1 Apr. 13, 2017

Related U.S. Application Data

(63) Continuation of application No. 14/722,449, filed on May 27, 2015, now Pat. No. 9,561,866.

(51) Int. Cl.
| | |
|---|---|
| *B64D 45/00* | (2006.01) |
| *B64D 43/00* | (2006.01) |
| *G04B 99/00* | (2006.01) |
| *G04G 9/00* | (2006.01) |
| *G01C 21/00* | (2006.01) |

(52) U.S. Cl.
CPC ............ *B64D 45/00* (2013.01); *B64D 43/00* (2013.01); *G04B 99/00* (2013.01); *G04G 9/0064* (2013.01); *B64D 2045/0075* (2013.01); *G01C 21/00* (2013.01)

(58) Field of Classification Search
CPC .. G08G 5/0021; G08G 5/0091; G08G 5/0013; G08G 5/0078
USPC ................................................ 340/971–980
See application file for complete search history.

(56) References Cited

U.S. PATENT DOCUMENTS

| | | | | |
|---|---|---|---|---|
| 6,144,619 A | * | 11/2000 | Reisman ................. | G04F 1/005 368/10 |
| 7,409,428 B1 | * | 8/2008 | Brabec .................... | H04L 29/06 709/205 |
| 9,244,649 B2 | * | 1/2016 | Ott .......................... | G01C 23/00 |

(Continued)

FOREIGN PATENT DOCUMENTS

WO WO 01/71433 * 3/2001 ............. G04B 19/26

OTHER PUBLICATIONS

Office Action issued in U.S. Appl. No. 14/722,449, dated May 27, 2016.

*Primary Examiner* — Emily C Terrell
*Assistant Examiner* — Sharmin Akhter
(74) *Attorney, Agent, or Firm* — Marshall, Gerstein & Borun LLP

(57) ABSTRACT

A wearable electronic display system detects aircraft flight related conditions, compares the detected flight related conditions with rules or procedures, retrieves flight condition information relating to phase of flight, and displays small amounts of contextually relevant flight condition information on a display screen.

20 Claims, 7 Drawing Sheets

(56) References Cited

U.S. PATENT DOCUMENTS

| | | | |
|---|---|---|---|
| 9,457,914 B1* | 10/2016 | Cline | B64D 45/00 |
| 2007/0288129 A1 | 12/2007 | Komer et al. | |
| 2009/0015438 A1* | 1/2009 | Sorbier | G08G 5/0021 |
| | | | 340/963 |
| 2009/0273487 A1* | 11/2009 | Ferro | B64C 1/1469 |
| | | | 340/963 |
| 2014/0266664 A1 | 9/2014 | Dwyer | |
| 2015/0094951 A1* | 4/2015 | Gepner | G01C 21/3632 |
| | | | 701/467 |
| 2015/0278498 A1 | 10/2015 | Hong et al. | |
| 2015/0314875 A1* | 11/2015 | Sander | B64D 11/0015 |
| | | | 340/945 |

* cited by examiner

WEARABLE ELECTRONIC DISPLAY AND METHOD FOR DISPLAYING INFORMATION TO A PILOT

FIELD

This invention relates to information displays for pilots and, more specifically, to wearable information displays that present focused, situation appropriate information to the pilot in short messages.

BACKGROUND

Pilots operating aircraft are often presented with large amounts of information in a short period of time. Most often, the information is provided by the aircraft's instruments and radios. During high workload phases of flight, the pilot may be presented with more information than can be timely processed. As a result, pilots learn to prioritize certain information during certain phases of flight. For example, during takeoff, the pilot may prioritize engine, airspeed and attitude information above all other types of information to ensure that the aircraft is placed in a condition for a safe takeoff. At other times, such as during abnormal or emergency situations, the pilot may become overwhelmed with the amount of information presented by the aircraft instruments.

Pilots currently deal with the high workload situations described above by prioritizing types of information (as discussed above) and/or by memorizing short concise items, such as emergency checklists and operating limitations. However, if a pilot is away from the flight station, for example during rest periods, during physiological breaks, or during pre-flight activities, the aircraft information may not be available to the pilot beyond what the pilot has memorized. As a result, the pilot is not presented with real-time, prioritized information in such circumstances.

SUMMARY

A wearable electronic display system detects aircraft and/or pilot conditions, compares the detected conditions with rules or procedures, retrieves contextual information relating to phase of flight or pilot physiological condition, and displays small amounts of contextually relevant information on a display screen.

The features, functions, and advantages that have been discussed can be achieved independently in various embodiments or may be combined in yet other embodiments further details of which can be seen with reference to the following description and drawings.

DESCRIPTION

In one example, which is described herein, a system includes a wearable electronic display and method for displaying small amounts of contextualized information to a pilot on the wearable electronic display. In this example, the wearable electronic display comprises a wrist mounted display screen, such as a watch with a display screen. However, in other examples, the display screen may be worn or carried on other parts of the body.

In this example, a wrist mounted electronic display screen monitors flight phase pertinent information and compares the flight phase pertinent information to rules and criteria, whether regulatory or operational in nature, and automatically prioritizes contextual information for display on the wrist mounted electronic display screen. The prioritization of contextual information will be discussed further below. As a result, a pilot has access to the prioritized contextual information regardless of the pilot's location within the aircraft or proximity to the aircraft. Moreover, the system may monitor a pilot's physiological state and tailor the information presented on the display according to the pilot's physiological condition to aid the pilot's comprehension of the presented information.

Figure 1:
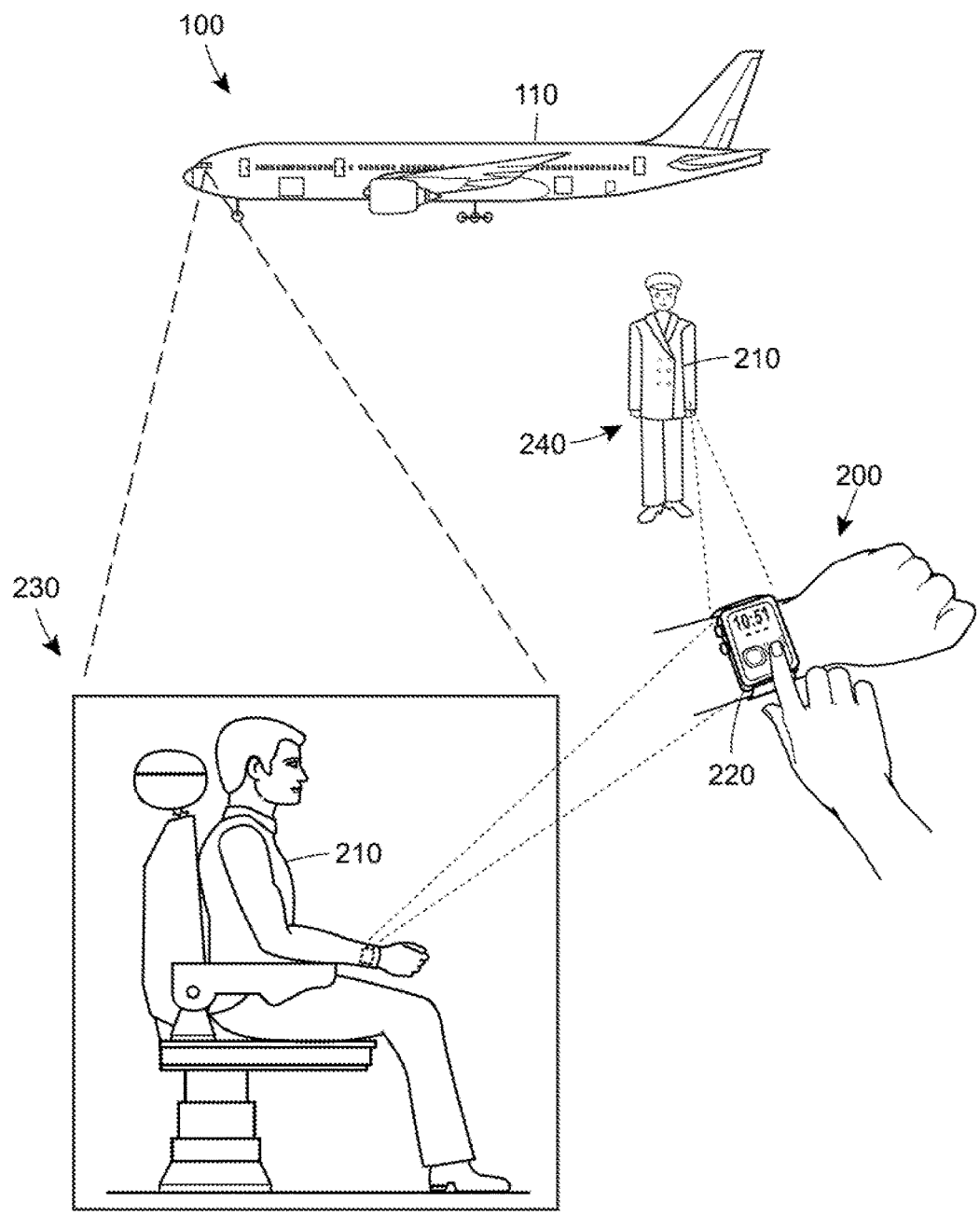
FIG. 1 is plan view of an aircraft, two different locations for pilots, and a wearable electronic display.

Referring to FIG. 1 a system 100 is illustrated that includes a wearable electronic display 200 for displaying small amounts of contextualized information to a pilot 210 on the wearable electronic display 200. The system 100 may include connections to certain systems within an aircraft 110, and the wearable electronic display 200. The wearable electronic display 200 is disposed in this example on a pilot's wrist 220, similar to a watch. In some embodiments the wearable electronic display 200 may include time information to function as a watch in addition to an electronic display that displays prioritized contextual information. The wearable electronic display 200 may be carried by the pilot 210 when the pilot 210 is seated at a flight station 230 within the flight deck of the aircraft 110, or when the pilot 210 is away from the flight station 230, such as when the pilot is performing pre-flight duties at a location 240 outside of the aircraft, when the pilot is on a rest break in a crew rest facility (not shown) outside of the flight station 230, or when the pilot is on a physiological break, such as in the lavatory (not shown). Regardless of the pilot's location, the pilot always has access to any information displayed on the wearable electronic display 200.

Figure 2:
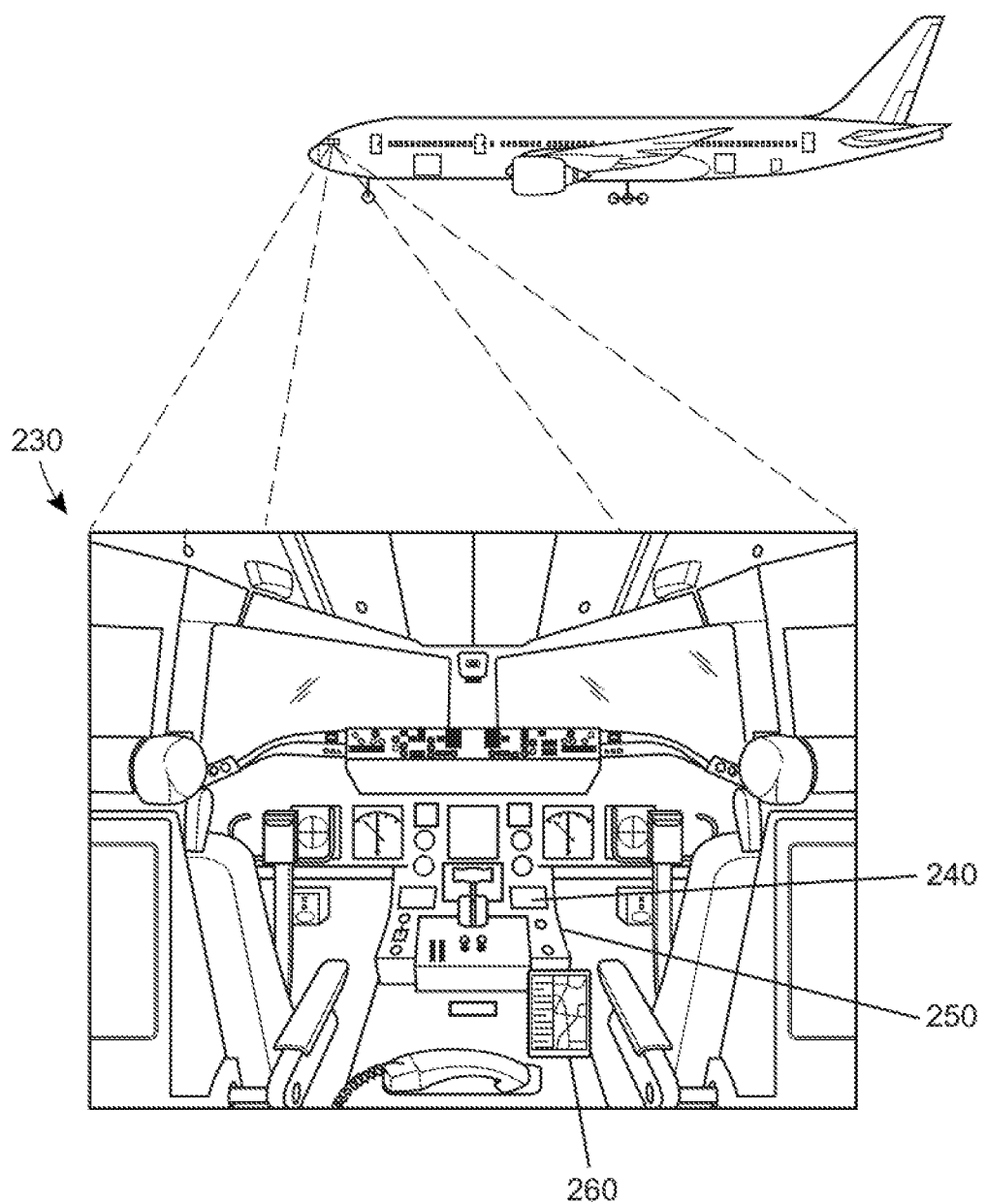
FIG. 2 is plan view of the aircraft of FIG. 1 including a close up view of the flight deck.

Turning now to FIG. 2, the wearable electronic display 200 may be wireless sly connected with one or more aircraft systems, such as, for example, a flight management system (FMS) 240, an onboard navigation system (ONS) 250, and/or an electronic flight bag system 260, such as, for example the Mobile FliteDeck®, FliteDeck VFR®, and FliteDeck Pro®, electronic flight bag systems marketed by Jeppesen®. Of course any other electronic flight bag product may be wirelessly connected to the wearable electronic display 200. Wireless connections may include WiFi or Bluetooth® wireless connections, or any other type of wireless connection. In some embodiments, multiple wearable electronic displays 200 may be wirelessly connected to one another. For example one wearable electronic display 200 may be worn by the captain and another wearable electronic display 200 may be worn by the first officer. In this case, the wearable electronic displays 200 may communicate wirelessly with one another.

Figure 3:
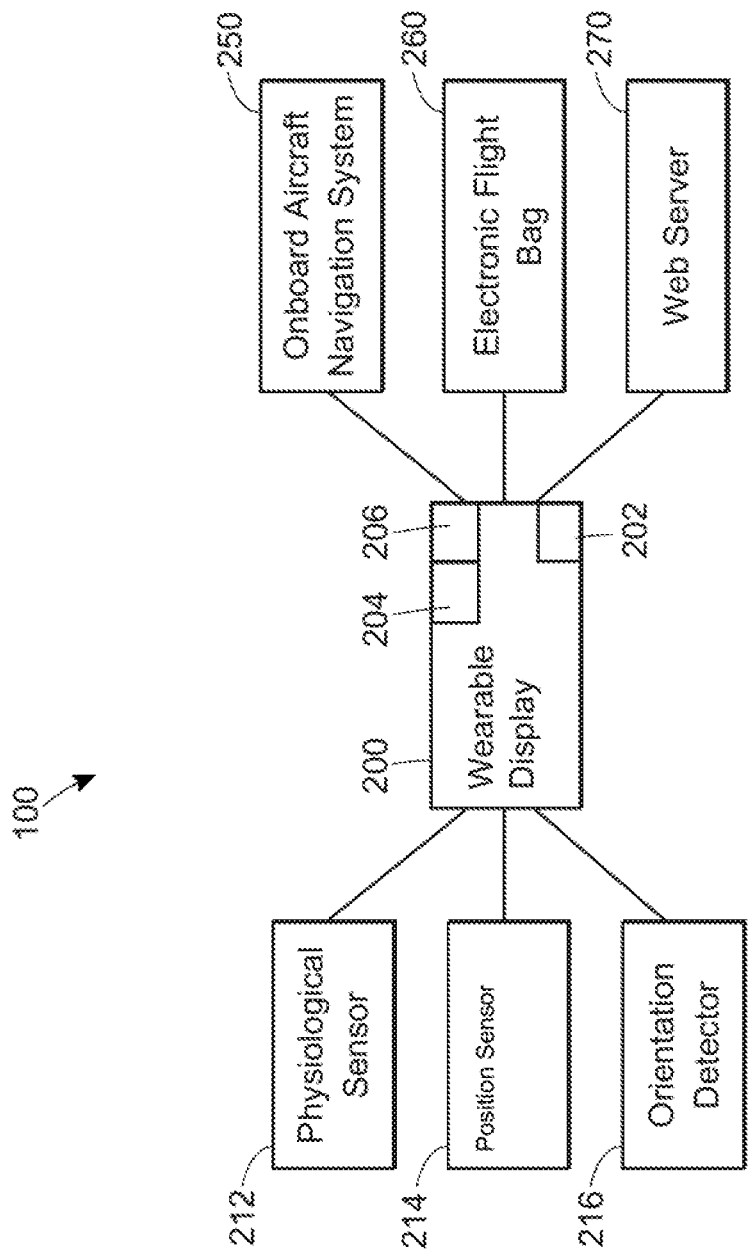
FIG. 3 is a schematic diagram of a system for displaying small amounts of contextualized information on a wearable display.

Turning now to FIG. 3, the system 100 may include the wearable electronic display 200, a processor 202, a memory 204 operatively connected to the processor 202, and a software program 206 stored in the memory 204 and executable on the processor 202. In the embodiment illustrated in FIG. 3, the processor 202, memory 204, and the software program 206 are all disposed within the wearable electronic display 200. In other embodiments, one or more of the processor 202, memory 204, and software program 206 may be located outside of the wearable electronic display 200 as long as the processor 202, memory 204, and software program 206 are communicatively connected to the wearable electronic display 200, such as by a wireless connection described above.

The wearable electronic display 200 may also be operatively connected to one or more sensors, such as a physiological sensor 212, a position sensor 214, and an orientation detector 216. The sensors provide information to the wearable electronic display 200 (more specifically to the processor 202) that may be used to determine a phase of flight, an aircraft and/or a pilot condition, and an aircraft position and orientation. This information may then be used by the processor to filter aircraft information and to prioritize the filtered information for display on the wearable electronic display 200.

The physiological sensor 212 may sense pilot related information such as, for example, heart rate, blood pressure, eye movement, skin moisture, skin temperature, etc., to determine the physiological state of the pilot. For example, the sensed information may indicate that the pilot is highly stressed due to elevated heart rate and blood pressure.

The position sensor 214 may sense the spatial location of the pilot, in some cases relative to the spatial location of the aircraft 110, or relative to a spatial location within the aircraft 110, to determine whether the pilot is in the flight station 230. In one example, the position sensor 214 may be a Global Positioning System (GPS) receiver, which locates the pilot's position in space independently of the aircraft position. In other embodiments, other types of position sensors 214 may be used, such as radio frequency locators, magnetic locators, or virtually any other type of locator. If the pilot is not located at the flight station 230, the system 100 may prioritize information that would be relevant given the pilot's actual location. For example, if the pilot is located outside of the aircraft 110, the system 100 may prioritize information relevant to pre-flight activities, such as maintenance information like deferred or active maintenance items, flight planning information like fuel loads, air traffic control information like estimated departure times, or any other information that may be relevant during pre-flight operations. In contrast, if the pilot is located within the aircraft 110, but not at the flight station 230, the system 100 may prioritize flight phase information, such as top of descent point, step climb points, areas of turbulence or icing, or emergency or abnormal situations, for display on the wearable electronic display 200.

The orientation detector 216 may sense the orientation of the aircraft 110 relative to a reference plane, such as horizontal, vertical, or any other reference plane. In some embodiments, the orientation detector 216 may be part of existing aircraft systems, such as the FMS 240 or the attitude indicator. The orientation detector 216 may detect, for example, aircraft pitch, aircraft yaw, aircraft roll, aircraft flight path vector, aircraft speed, aircraft sink rate or climb rate, or any other measure of aircraft orientation. The system 100 may prioritize information that would be relevant given the aircraft's orientation. For example, if both aircraft pitch and flight path vector are positive (i.e., above the horizontal plane), then the system 100 may determine that the aircraft is in a climb phase of flight and prioritize information for the climb phase. If the aircraft pitch is positive and the flight path vector is zero, the system 100 may determine that the aircraft is in a cruise phase of flight and prioritize information for the cruise phase. If both the aircraft pitch and the flight path vector are negative, the system 100 may determine that the aircraft 110 is in a descent phase of flight and prioritize information for the descent phase. If the aircraft pitch is positive, but the flight path vector is negative, the system 100 may determine that the aircraft is in an approach phase of flight and prioritize information for the approach phase. If the aircraft pitch is positive and very large (e.g., more than 10 degrees) and the flight path vector is negative, the system 100 may determine that the aircraft is in a stalled condition and prioritize information for the abnormal stall phase. Alternatively, the system 100 may obtain phase of flight information from the FMS 240.

As illustrated in FIG. 3, the wearable electronic display 200 may be wirelessly connected to the onboard navigation system (ONS) 250, an electronic flight bag (260), and/or a web server 270. Each of these systems may provide relevant contextual information to the processor 202 so that the processor 202 may prioritize information for display on the wearable electronic display 200.

Figure 4:
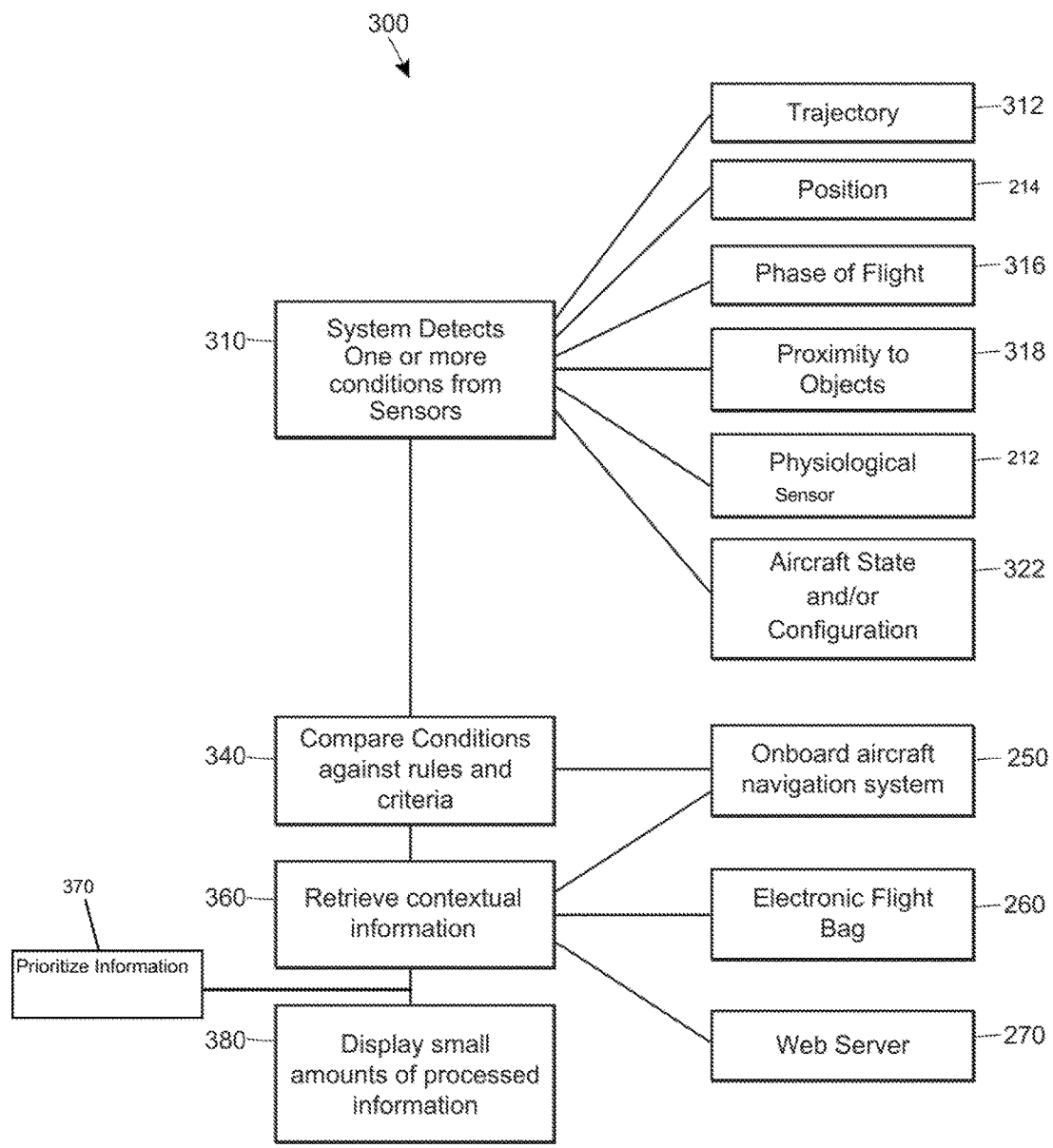
FIG. 4 is a logic diagram followed by the system of FIG. 3.

Turning now to FIG. 4, a logic diagram 300 is illustrated that may be used by the processor 202 (by executing for example the software program 206) to determine contextually appropriate information to display on the wearable electronic display 200. In a first step 310, the processor 202 may detect one or more flight and/or pilot related conditions (aircraft or physiological conditions) from one or more sensors. For example, the processor 202 may detect aircraft conditions from a trajectory sensor 312 (for example the FMS or attitude indicator), the position sensor 214 (for example a GPS receiver or an ONS device), a phase of flight sensor 316 (which may be a combination of other sensors, for example, by combining trajectory information and position information, or an independent phase of flight sensor like the FMS), a proximity sensor 318 (which may be a terrain avoidance system, or a radar altimeter system), the physiological sensor 212 (such as a heart rate sensor, a blood pressure sensor, an eye movement sensor, a skin moisture sensor, or any other physiological sensor), and an aircraft state or configuration sensor 322 (which may be the FMS or other aircraft configuration sensor, such as gear and flap indicators).

At step 340, the processor 202 may compare the sensed conditions (aircraft and/or physiological) against known rules and criteria. For example, if the processor 202 detects a clean aircraft configuration (i.e., landing gear and flaps are up) with an aircraft position that has a low altitude above the ground (e.g., below 2,000 feet), the processor may prioritize configuration information for display on the wearable electronic display 200. More specifically, in this case, the processor 202 may direct the wearable electronic display 200 to display a message instructing the pilot to configure the aircraft for landing. The location of the aircraft may also have a bearing on the context of the aircraft's position above the ground. The location of the aircraft may be obtained at this step from the ONS 250.

At step 360, the processor 202 retrieves flight condition information from the sensors and systems described above to aid in prioritizing the type and amount of information to be displayed on the wearable electronic display 200. The processor 202 may retrieve contextual information from the ONS 260, the electronic flight bag 260, and/or a web server 270. The relevant contextual information may include operational procedures specific to a certain operating certificate (such as the minimum altitude for configuring the aircraft for landing), or regulatory procedures that apply to all aircraft within a given operational jurisdiction (such as maximum airspeed below 10,000 feet). This contextual information is used to prioritize the information to be presented on the wearable electronic display 200.

At step 370, the processor 200 prioritizes the flight condition information for display on the wearable electronic display 200. The prioritization process is described further below with respect to FIG. 5.

At step 380, the processor 200 sends the prioritized flight condition information to the wearable electronic display 200 in small packets so that the presented information is quick and easy to read and understand. Generally, small packets of information are limited to less than 100 characters, and in some cases less than 50 characters, depending upon the type of information to be displayed.

Figure 5:
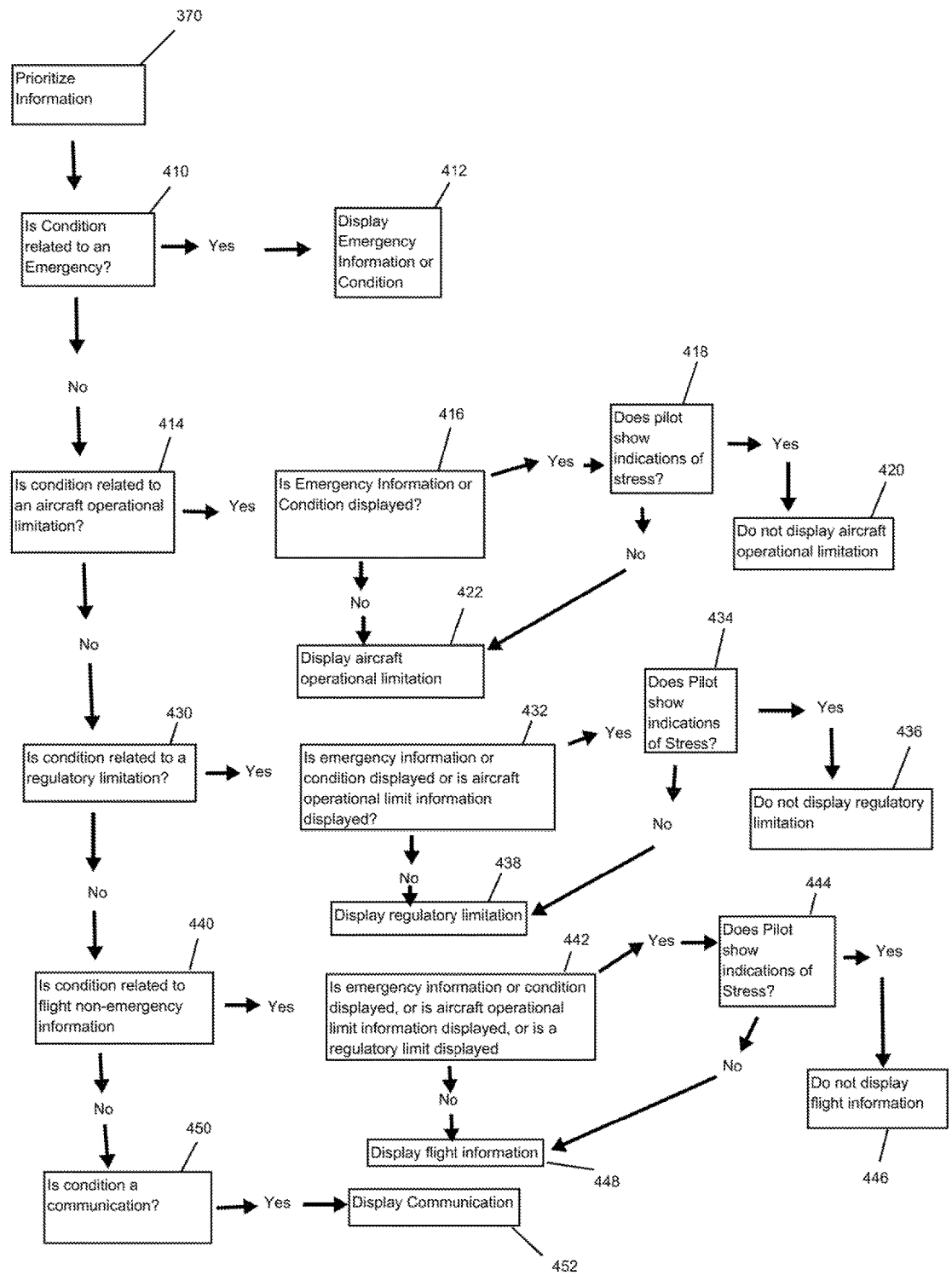
FIG. 5 is a logic diagram for prioritizing information that is followed by the system of FIG. 3.

Turning now to FIG. 5, the prioritization process is illustrated in detail. Initially, at step 410 the processor 200 determines whether the detected condition from step 310 in FIG. 3 is related to an emergency by comparing characteristics of the detected condition to indications of an emergency condition that may be stored in the memory 204. Emergency conditions may be set by the aircraft manufacturer, which may be reflected in the quick reference handbook (QRH) or other operational manual. If desired, emergency conditions may be set by the aircraft operator to include more conditions than those identified by the aircraft manufacturer. Regardless, if the processor 200 determines that the detected condition is related to an emergency condition (for example, engine failure, engine fire, engine stall or surge, rapid depressurization, or any other determined emergency condition), the processor 200 then sends emergency related information (such as an emergency checklist or memory item), which also may be retrieved from the memory 204, to the display at step 412. A memory item is a portion of the emergency checklist that includes immediate action items, which are often required to be memorized by the pilots as part of operations specifications. The process of determining the emergency information to be displayed will be discussed further with respect to FIG. 6.

If the processor 200 determines that the detected condition is not related to an emergency condition, the processor 200 proceeds to step 414 to determine if the detected condition is related to an aircraft operational limitation (such as maximum or minimum airspeed, maximum flap extension speed, turbulence penetration speed, or any other aircraft operational limitation) by comparing characteristics of the detected condition to indications of an aircraft operational limitation that may be stored in the memory 204. If the processor 200 determines that the detected condition is related to an aircraft operational limitation, the processor 200 then proceeds to step 416 to determine if emergency information is displayed from step 412. If the processor 200 determines that emergency information is already displayed, the processor then proceeds to step 418 to determine the pilot's stress level by, for example, retrieving physiological information from the pilot by means of the physiological sensor 212. If the processor 200 determines that the pilot is showing signs of stress, by comparing inputs from the physiological sensor 212 to known indications of stress that may be stored in the memory 204, the processor 200 inhibits display of the aircraft operational limitation at step 420. The purpose of this step is to display only the most critical information to the pilot so that the pilot does not become cognitively overloaded in emergency or abnormal flight situations. If, on the other hand, the processor 200 determines that the pilot is not showing signs of stress, the processor 200 may send the aircraft operational limitation information to the display at step 422.

If the processor 200 determines that the detected condition is not related to an emergency condition or an aircraft operational limitation, the processor 200 then determines if the detected condition is related to a regulatory limitation (such as maximum airspeed below 10,000 ft. in the U.S.), at step 430 by comparing characteristics of the detected condition to indications of a regulatory limitation that may be stored in the memory 204. If the detected condition is related to a regulatory limitation, the processor 200 then determines if there is emergency information or aircraft operational limitation information displayed at step 432. If there is emergency information or aircraft operational limitation information displayed, the processor 200 then determines if the pilot is showing signs of stress at step 434. If the pilot is showing signs of stress, the processor 200 inhibits display of the regulatory limitation at step 436. If the pilot is not showing signs of stress, the processor 200 may send the regulatory limitation information to the display at step 438.

If the processor 200 determines that the detected condition is not related to an emergency condition, to an aircraft operational limitation, or to a regulatory limitation, the processor 200 then determines if the detected condition is related to a flight non-emergency condition (such as approaching top of climb or top of descent point on the flight plan) at step 440, by comparing characteristics of the detected condition to indications of a flight non-emergency condition that may be stored in the memory 204. If the detected condition is related to a flight non-emergency condition, the processor 200 then determines if there is emergency information, aircraft operational limitation information, or regulatory limitation information displayed at step 442. If there is emergency information, aircraft operational limitation information, or regulatory information displayed, the processor 200 then determines if the pilot is showing signs of stress at step 444. If the pilot is showing signs of stress, the processor 200 inhibits display of the regulatory limitation at step 446. If the pilot is not showing signs of stress, the processor 200 may send the regulatory limitation information to the display at step 448.

If the processor 200 determines that the detected condition is not related to an emergency condition, to an aircraft operational limitation, to a regulatory limitation, or to flight non-emergency information, the processor 200 then determines if the detected condition is a communication (such as a short message from another pilot), at step 450. The processor 200 may send the communication to the display at step 452 regardless of what other information is displayed because crew communication is of primary importance at all times.

Figure 6:
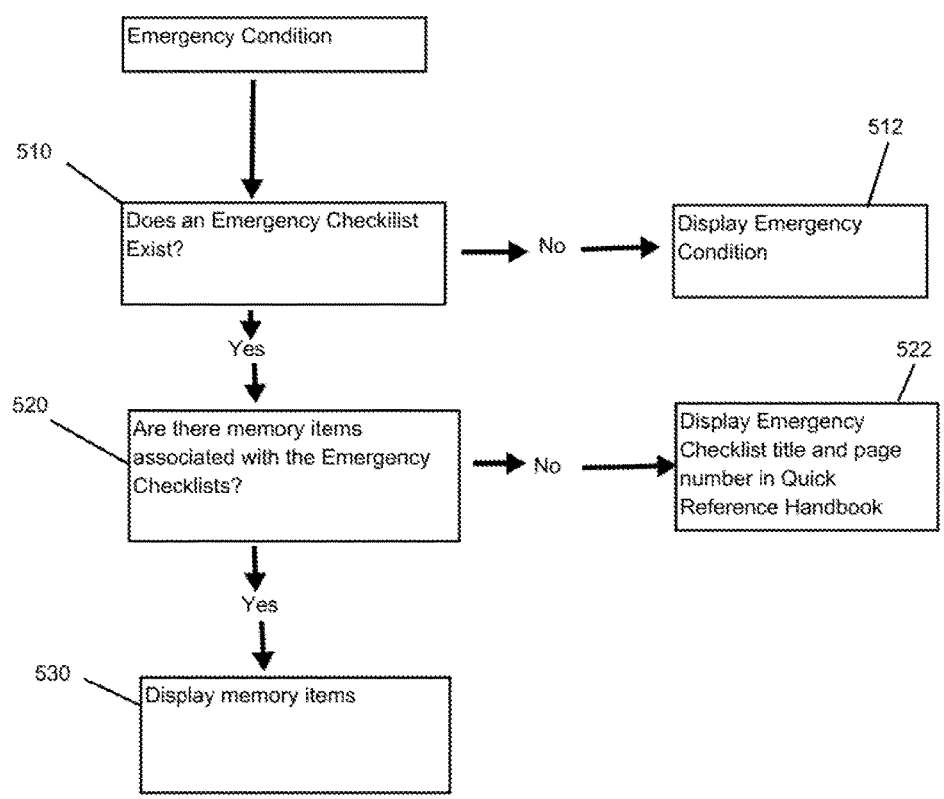
FIG. 6 is a logic diagram for determining emergency information to display that is followed by the system of FIG. 3.

Turning now to FIG. 6, prioritization of emergency information is described. The prioritization steps illustrated in FIG. 6 may take place after the processor 200 has determined that the condition is related to an emergency at step 410 in FIG. 5. At step 510, the processor determines if an emergency checklist exists for the detected condition, by comparing characteristics of the emergency condition to a list of emergency checklists that may be stored in the memory 204. For example, an emergency checklist may be any checklist contained in the QRH or other operational manual. If no emergency checklist exists, the processor 200 may send a description of the emergency condition to the display at step 512. If an emergency checklist exists, then the processor 200 determines if the emergency checklist includes memory items at step 520. If no memory items exist, the processor 200 may send a short description of the emergency checklist (such as title and page number in the QRH) to the display at step 522. If the processor 200 determines that memory items exist, the processor 200 may send the memory items to the display at step 530. The memory items may not be limited by the normal short message limitation of 100 characters or less, but rather, the processor 200 may send the entire set of memory items to the display to ensure that the pilot has access to all the memory items.

Figure 7:
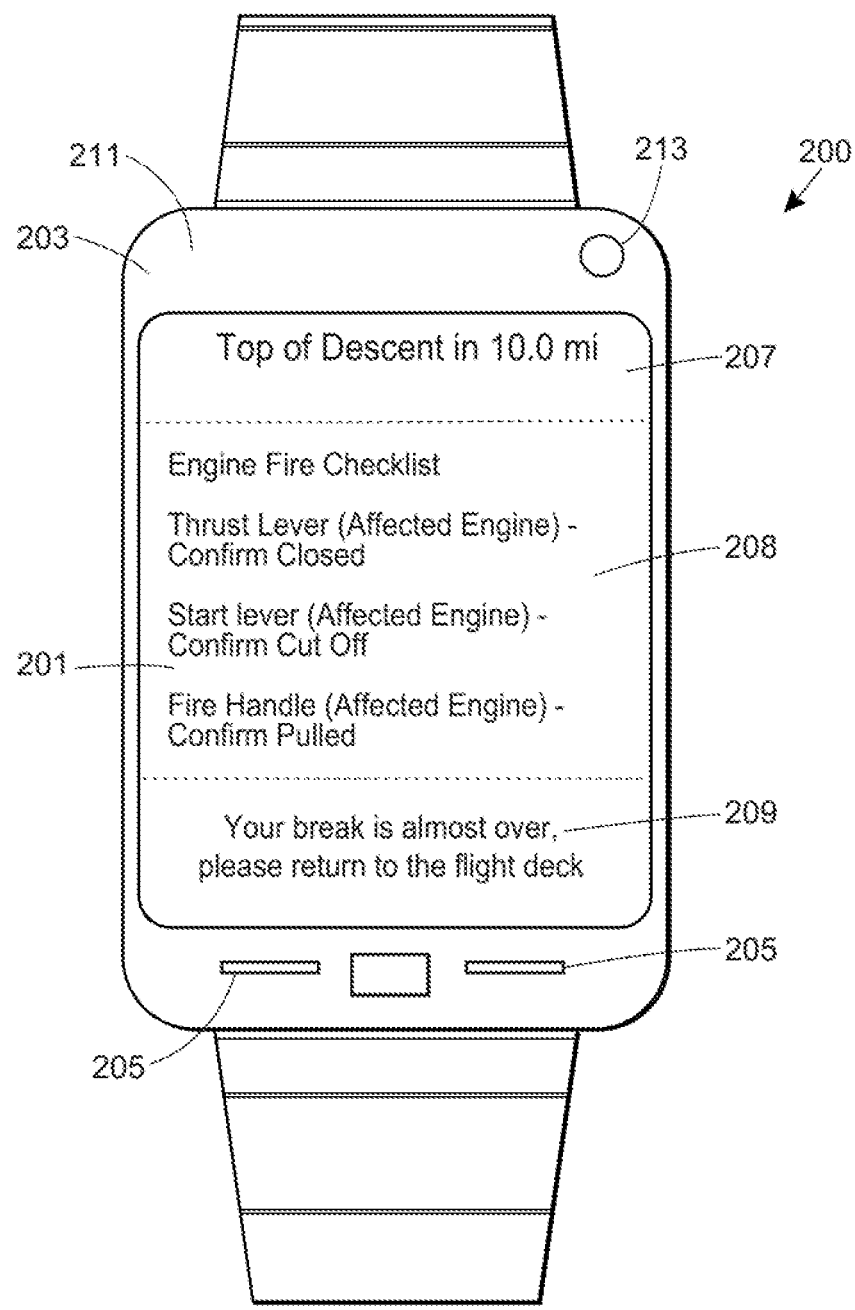
FIG. 7 is a close-up view of the display of the system of FIG. 3.

Turning now to FIG. 7, one example of a wearable electronic display 200 is illustrated. The wearable electronic display 200 may include a display screen 201, a case 203 that supports and protects the display screen 201, and one or more operator interface devices, such as buttons 205. The display screen 201 may be divided into areas or sectors for the presentation of certain information. For example, a first sector 207 may be reserved for flight informational parameters, such as suggested top of climb or top of descent points, weather information, or other flight related information. A second sector 208 may be reserved for time critical, very important information, such as memory items or emergency checklists. A third sector 209 may be reserved for short messages, for example from another pilot or from the dispatcher. Each sector 207, 208, 209, may include a defined number of characters for display. For example, the first sector 207 may be limited to 50 characters, or less, the second sector 208 may be limited to 100 characters or less, and the third sector 209 may be limited to 50 characters or less. In this way, the pilot immediately knows the level of importance of the presented information simply based on the location of the information on the display screen 201 and the amount of information presented in each sector 207, 208, 209 is limited for ease of comprehension while balancing the need to display enough information to be helpful to the pilot.

In some embodiments, the wearable electronic display 200 may include alerting mechanisms, such as haptic/tactile alarms 211 (such as a vibrating mechanism) or audible alarms 213 (such as a speaker) to alert the pilot that relevant contextual information is being displayed.

The system and wearable electronic display described above advantageously present a pilot with real time, contextually relevant information in small pieces that are easy to read and comprehend, regardless of the pilot's location within or outside of the aircraft and regardless of the pilot's physiological state.

While various embodiments have been described above, this disclosure is not intended to be limited thereto. Variations can be made to the disclosed embodiments that are still within the scope of the appended claims.

What is claimed is:

1. A system for displaying contextualized flight information to a pilot on a wrist wearable electronic display, the system comprising:
   a wrist wearable electronic display;
   a processor operatively coupled to the wrist wearable electronic display;
   a memory operatively coupled to the processor; and
   a software program stored in the memory and executable on the processor, the software program detecting a flight related condition, retrieving flight condition information related to the flight related condition, comparing the flight related condition against rules and criteria, and using the flight condition information to prioritize contextual information related to the flight related condition that is displayed on the wrist wearable electronic display.

2. The system of claim 1, wherein the prioritized contextual information is limited to 100 characters or less.

3. The system of claim 1, wherein the processor is communicatively connected to, and retrieves the flight condition information from, one of an aircraft flight management system, an electronic flight bag system, a proximity locator, and an orientation detector.

4. The system of claim 1, wherein the processor compares the flight related condition to an aircraft limitation parameter.

5. The system of claim 4, wherein the aircraft limitation parameter is an aircraft operational limitation.

6. The system of claim 5, wherein the aircraft limitation parameter is an aircraft regulatory limitation.

7. The system of claim 5, wherein the flight condition information is retrieved from a flight management system.

8. The system of claim 5, wherein the flight condition information is retrieved from an electronic flight bag.

9. The system of claim 1, wherein the prioritized contextual information includes at least one of:
   takeoff minima, approach minima, missed approach information, top of climb location, top of descent location, radio frequencies, holding information, deicing holdover times, and short messages from dispatch or other pilots.

10. The system of claim 1, wherein the wearable electronic display includes an alarm to alert the pilot to the contextual information that is displayed on the wearable electronic display and,
    wherein the alarm includes one of a haptic alarm, a tactile alarm, a vibration alarm, and an audible alarm.

11. A system for displaying contextualized flight information to a pilot on a wearable electronic display, the system comprising:
    a wearable electronic display;
    a processor operatively coupled to the wearable electronic display;
    a memory operatively coupled to the processor; and
    a software program stored in the memory and executable on the processor, the software program detecting a flight related condition, retrieving flight condition information related to the flight related condition, comparing the flight related condition against rules and criteria, and using the flight condition information to prioritize contextual information related to the flight related condition that is displayed on the wearable electronic display,
    wherein the prioritized contextual information is prioritized based on the location of the wearable electronic display relative to a flight station.

12. A wearable electronic display, the display comprising:
    a display screen; and
    a processor operatively coupled to the display screen;
    wherein the processor is programmed to display, on the display screen, small amounts of flight condition information after comparing the flight condition information against rules and criteria, and to prioritize the flight condition information based on a phase of flight to which the type of flight condition information is related and based on a location of the wearable electronic display.

13. The display of claim 12, wherein the flight condition information includes at least one of:

takeoff minima, approach minima, missed approach information, top of climb location, top of descent location, radio frequencies, holding information, deicing holdover times, and short messages from dispatch or other pilots.

14. The display of claim 12, wherein the processor compares the flight condition information to an aircraft limitation parameter.

15. The system of claim 14, wherein the aircraft limitation parameter is an aircraft operational limitation.

16. The system of claim 15, wherein the aircraft limitation parameter is an aircraft regulatory limitation.

17. The system of claim 15, wherein the flight condition information is retrieved from a flight management system.

18. The system of claim 15, wherein the flight condition information is retrieved from an electronic flight bag.

19. The display of claim 12, wherein the flight condition information is limited to 100 characters or less.

20. A method of displaying flight condition information on a wrist wearable electronic display, the method comprising the steps of:

detecting one or more conditions of an aircraft;

comparing the detected conditions to known rules and criteria;

retrieving contextual information relating to one or more detected conditions; prioritizing the contextual information based on the one or more detected conditions; and displaying small amounts of prioritized contextual information on the wrist wearable electronic display screen, wherein the known rules and criteria include one or more of an aircraft operational limitation and a regulatory limitation.

* * * * *

UNITED STATES PATENT AND TRADEMARK OFFICE
CERTIFICATE OF CORRECTION

| | |
|---|---|
| PATENT NO. | : 10,450,085 B2 |
| APPLICATION NO. | : 15/384978 |
| DATED | : October 22, 2019 |
| INVENTOR(S) | : Jeffrey L. Williams et al. |

It is certified that error appears in the above-identified patent and that said Letters Patent is hereby corrected as shown below:

In the Claims

At Column 9, Line 11, "The system of" should be -- The display of --.

At Column 9, Line 13, "The system of" should be -- The display of --.

At Column 9, Line 15, "The system of" should be -- The display of --.

At Column 9, Line 17, "The system of" should be -- The display of --.

Signed and Sealed this
Twelfth Day of May, 2020

Andrei Iancu
*Director of the United States Patent and Trademark Office*